UNITED STATES PATENT OFFICE.

JOHN GEORGE POPP, OF VIENNA, AUSTRIA.

IMPROVEMENT IN MEDICATED LOTIONS.

Specification forming part of Letters Patent No. 30,834, dated December 4, 1860.

*To all whom it may concern:*

Be it known that I, JOHN GEORGE POPP, of the city of Vienna, in the Empire of Austria, have invented a new and Improved Composition for the Complete Cure of all Afflictions of the Mouth and Teeth; and I do hereby declare that the following is a full, clear, and exact description of the same.

My composition, which I term "Anatherin Water," consists of an extract of spoon-root, root of the grape-vine, sage, rose-leaves, pellitory, Peruvian bark, abrotanum, horse-radish, anatherin or alkanet root, and cloves in alcohol mixed with tincture myrrh and tincture guajaci in about the following proportion: spoon-root, (*Cochlearia officinalis,*) root of the grape-vine, (*Vitis vinifera,*) sage, rose-leaves, pellitory, Peruvian bark, abrotanum, horse-radish, one-half ounce each, is mixed with sixteen ounces of alcohol and a like quantity of pure water, and left standing for about two weeks in a warm place. The extract thus obtained is mixed with anatherin-root, (*anchusa tinctoria,*) one ounce; cloves, one ounce; and the mixture is now again left standing for about two weeks more. The fluid is now poured off and filtered and it is mixed with tincture myrrh, one ounce; tincture guajaci, one ounce, and the composition is ready for use.

This composition which I call "Anatherin Water" is of peculiar value for cleaning the teeth. It also serves in all cases where a tartarous deposit begins to form. It restores the teeth to their primitive color. It preserves false teeth. It soothes and removes rheumatic pains and also the pains produced by decayed teeth. It cures fungous and spongy gums. It gives firmness to loose teeth. It prevents an easy bleeding of the gums. It counteracts those causes which produce corruptness of the teeth, and it serves for the maintenance of a good and the removal of a bad breath. A small quantity of my Anatherin Water used every day will preserve the teeth during the whole life. It can be made cheap, and it does not contain poisonous ingredients, so that it can be used with perfect safety and without danger.

Having thus described my invention, what I claim as new, and desire to secure by Letters Patent, is—

The employment or use of the composition which I term "Anatherin Water," and which consists of the within-described ingredients mixed together in about the proportion and for the purpose herein specified.

JOHN GEORGE POPP. [L. S]

Witnesses:
IGNATZ PIMBERGER,
A. BADOCH.